United States Patent

Tejima

Patent Number: 5,471,473
Date of Patent: Nov. 28, 1995

[54] COMMUNICATION SYSTEM AND DEVICES THEREOF

[75] Inventor: Shunichiro Tejima, Tokyo, Japan

[73] Assignee: NEC Corporation, Tokyo, Japan

[21] Appl. No.: 220,026

[22] Filed: Mar. 30, 1994

[30] Foreign Application Priority Data

Mar. 30, 1993 [JP] Japan .................................. 5-072183

[51] Int. Cl.$^6$ .................................. H04B 7/26; H04J 3/16
[52] U.S. Cl. .................. 370/85.7; 370/95.1; 455/34.1; 455/54.2
[58] Field of Search ............................ 370/24, 29, 30, 370/50, 85.7, 85.8, 94.1, 95.1, 95.2, 95.3, 110.1; 379/58, 59, 60, 63; 455/33.1, 33.2, 34.1, 34.2, 49.1, 53.1, 54.1, 54.2, 56.1

[56] References Cited

U.S. PATENT DOCUMENTS

| | | | |
|---|---|---|---|
| 4,815,073 | 3/1989 | Grauel et al. | 370/95.1 |
| 4,817,089 | 3/1989 | Paneth et al. | 370/95.1 |
| 5,101,407 | 3/1992 | Harvey et al. | 370/95.3 |
| 5,210,752 | 5/1993 | Ito et al. | 370/95.1 |
| 5,239,677 | 8/1993 | Jasinski | 455/34.1 |
| 5,278,835 | 1/1994 | Ito et al. | 370/95.3 |

FOREIGN PATENT DOCUMENTS

| | | |
|---|---|---|
| 63-105533 | 5/1988 | Japan . |
| 1-093946 | 4/1989 | Japan . |
| 1-098399 | 4/1989 | Japan . |

*Primary Examiner*—Alpus Hsu
*Attorney, Agent, or Firm*—Sughrue, Mion, Zinn, Macpeak & Seas

[57] ABSTRACT

A communication system, which includes a central station and a plurality of peripheral stations and as a packet data signal and a speech signal, assigns a speech communication channel by using the packet data communication channel. The speech communication is done over the assigned carrier between one peripheral station and the central station or another peripheral station.

8 Claims, 3 Drawing Sheets

COMMUNICATION SYSTEM AND DEVICES THEREOF

BACKGROUND OF THE INVENTION

1. Field of the Invention

The present invention relates to a communication system and, more particularly, to digital radio communication technique for promoting the effective use of limited frequency resources.

2. Description of the Related Art

In a radio communication system made up of a central station and a plurality of peripheral stations, communication is sometimes effected by using both speech and packet data. For example, a very small aperture terminal (VSAT) satellite communication system having a central station and a plurality of peripheral stations, may be constructed such that mainly the central station and the peripheral stations interchange packet data in a star configuration, while peripheral stations perform speech communication with other peripheral stations in a mesh configuration or perform it with the central station in a star configuration.

In the system described above, for packet data communication in the star configuration, it is a common practice to assign a pair of carriers between the central station and a group of several to several hundred peripheral stations. The central station broadcasts multiplexed packet data to the peripheral stations by a continuous wave. Each peripheral station sends packetized data to the central station in bursts by a multiaccess system including random access or Time Division Multiple Access (TDMA).

On the other hand, for speech communication, a pair of carriers are assigned to the stations to effect the communication therebetween. In this case, the carriers are, in many cases, not fixedly assigned, but are assigned by demand assignment control. Specifically, the central station has a demand assignment control device. Each peripheral station communicates, every time a call is originated, with the demand assignment control device to request it to assign a carrier. After the carrier assignment, the peripheral station holds speech communication with the desired remote station. When the call ends, the carrier assigned to the peripheral station is released.

It has been customary with the above-stated system to prepare an exclusive carrier as a control channel for the communication of the peripheral station with the demand assignment control device at the beginning and end of a call. While a call is not originated, each peripheral station remains in a stand-by state, i.e., ready to send and receive the carrier for the control channel. On the origination of a call, the peripheral station communicates with the demand assignment control device over the control channel and, after carrier assignment, holds speech communication with the desired station by use of the assigned carrier. At the end of the call, the peripheral station restores the stand-by state while the demand assignment control device releases the carrier occupied for the speech communication.

The conventional exclusive carrier scheme has some problems left unsolved, as follows. Usually, the frequency at which call origination occurs is extremely low. Hence, fixedly assigning an exclusive carrier to the control channel is wasteful, considering limited frequency resources. In light of this, a plurality of stations have customarily shared a single control channel. As a result, there is needed a complicated control channel access circuit for executing random access, TDMA or similar access.

On the other hand, a communication system which assigns the same channel to a packet data signal and a speech signal and switches this channel is described in, for example, Japanese Laid-Open Patent Publication No. 105533/1988 (JP-A-63-105533). This system, however, needs to switch the same channel to the packet data signal and the speech signal.

Moreover, a technique of transmitting a request for a assignment of a speech channel in the form of a packet data signal and of communicating a speech signal by using the same as the channel of the packet data signal is described in, for example, Japanese Laid-Open Patent Publication Nos. 93946/1989 (JP-A-01-93946) or 98399/1989 (JP-A-01-98399). In this technique, however, the central station needs to be able to control a communication channel and switch speech data because the communication is done via the central station when one peripheral station communicates with another peripheral station.

SUMMARY OF THE INVENTION

It is therefore an object of the present invention to provide a communication system capable of controlling speech communication by using a channel assigned to packet data communication, and a central station device and a peripheral station device therefor.

Another object of the present invention is to provide a communication system capable of communicating between two peripheral stations by using a speech channel.

According to the present invention, the communication system includes a plurality of peripheral stations, each of which sends a request signal, for requesting a central station to set up a speech channel, in the form of a packet data signal to the central station by using a predetermined carrier, receives a report signal from the central station in the form of the packet data signal by using the predetermined carrier, and sets up a speech communication frequency in response to the report signal, and a central station which receives said request signal from any one of the peripheral stations, assigns a carrier frequency in response to the request signal, and sends to the peripheral station the report signal reporting assignment of the carrier frequency.

The peripheral station sends the end of the speech communication by using the carrier of the packet data communication.

The request signal for the speech channel and the report signal for an assignment of a carrier frequency are communicated between the central station and the peripheral station by using the predetermined carrier of the packet data signal communication.

A carrier frequency assigned by the central station is used in the speech communication between the peripheral stations or the central station and the peripheral station.

BRIEF DESCRIPTION OF THE DRAWINGS

The above and other objects, features and advantages of this invention will become more apparent from the following detailed description taken with the accompanying drawings in which.

DESCRIPTION OF THE PREFERRED EMBODIMENT

A preferred embodiment of the present invention will now be described in detail with reference to the accompanying drawings.

Figure 1:
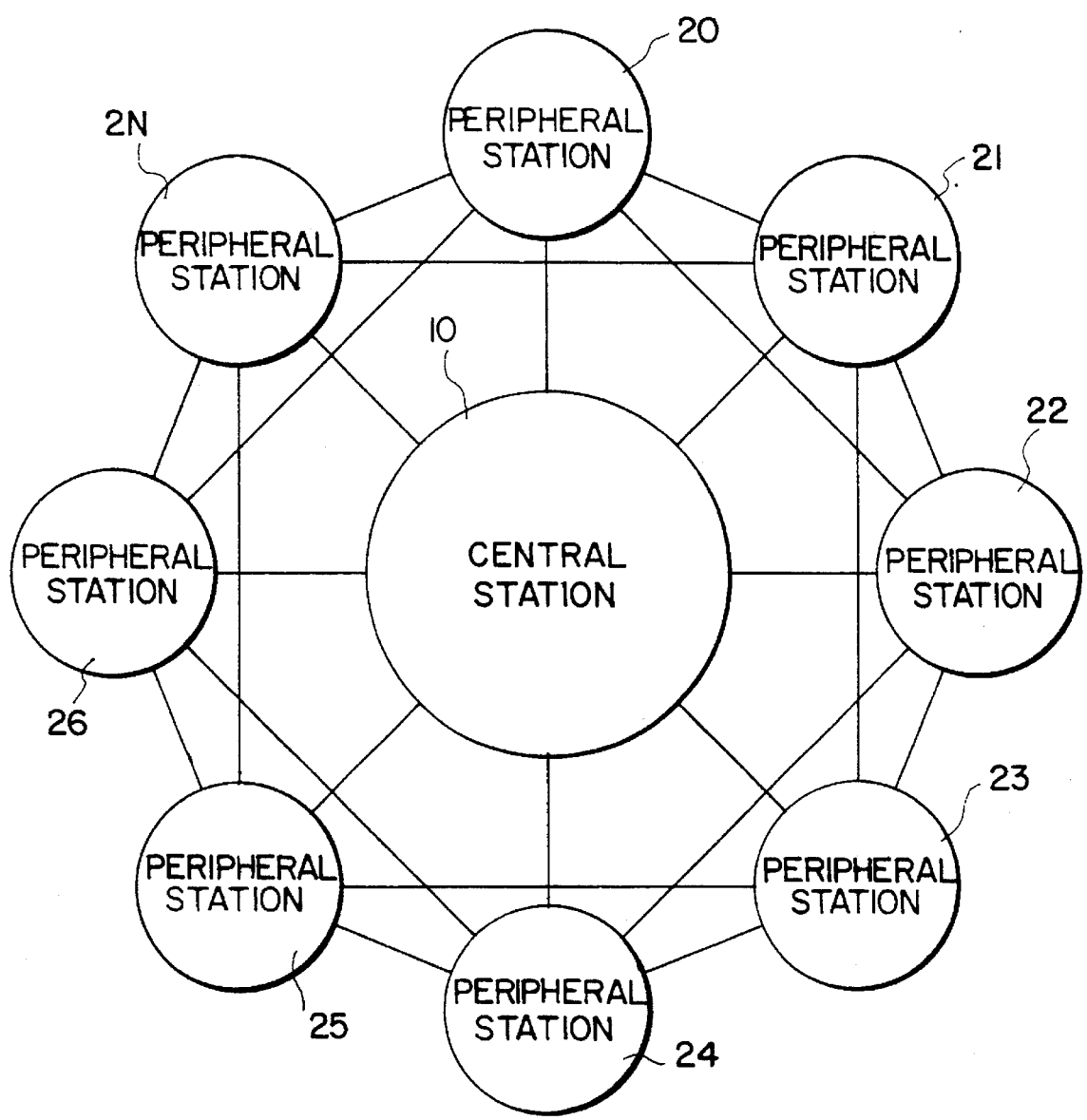
FIG. 1 is a block diagram illustrating a typical communication system to which both prior art and present communication systems are applicable.

As shown in FIG. 1, a communication system is generally made up of a central station 10 and a plurality of peripheral stations 20 to 2N. The plurality of peripheral stations 20 to 2N are connected by radio channels with other peripheral stations or the central station 10 and capable of interchanging packet data signals and/or speech signals.

Figure 2:
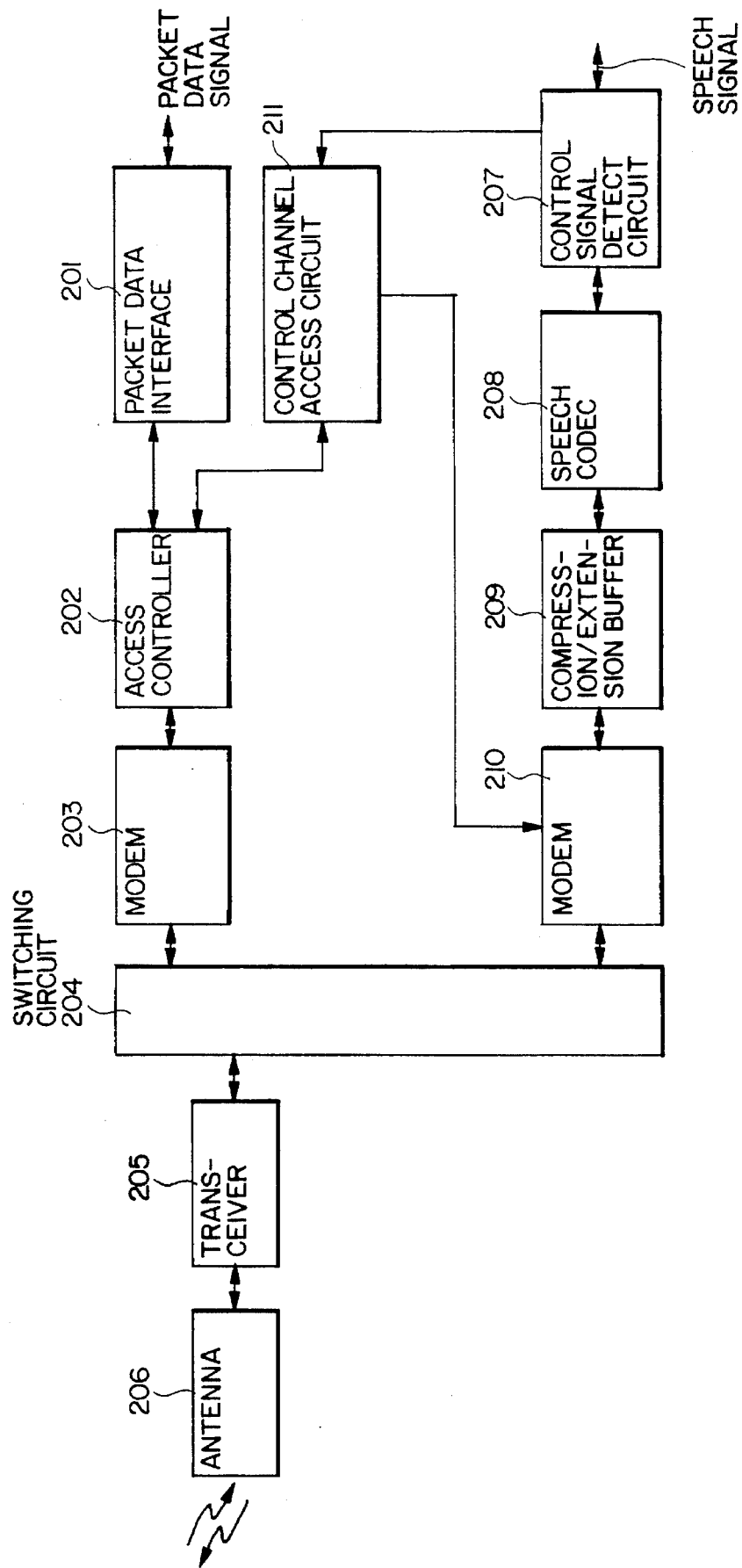
FIG. 2 is a block diagram of a preferred embodiment of a peripheral station of the present invention.

FIG. 2 shows a block diagram of a preferred embodiment according to the teachings of this invention of each peripheral station shown in FIG. 1. The peripheral station consists of a packet data interface 201, an access controller 202, modems 203 and 210, a switching circuit 204, a transceiver 205, an antenna 206, a control signal detecting circuit 207, a speech codec 208, a compression/extension buffer 209, and a control channel access circuit 211.

First, there will be described a packet data communication. A packet data to be sent is input to the peripheral station via the packet data interface 201 from an external terminal. The access controller 202 executes access control, e.g., TDMA control or a random access control for the radio channel of packet data signal communication effectively. The modem 203 modulates the packet data signal and supplies the modulated packet data signal to the transceiver 205 via the switching circuit 204. The modulated packet data signal is transmitted from the antenna 206 to the central station 10.

A packet data signal from the central station 10 is received by the transceiver 205 through the antenna 206. The received packet data signal is demodulated at the modem 203 via the switching circuit 204. The demodulated packet data signal is delivered to the terminal via the access controller 202 and the packet data interface 201.

Next, there will be described a speech signal communication. A request for an assignment of a speech communication channel will be described later.

A speech signal is encoded by the speech codec 208 via the control signal detecting circuit 207 from the external terminal. The encoded signal is compressed at the compression/extension buffer 209. A carrier assigned by the central station 10 is modulated by the encoded signal at the modem 210. The carrier signal modulated through the switching circuit 204 is transmitted from the antenna 206 by the transceiver 205 to the central station 10 or another peripheral station.

A speech signal from the central station 10 or the other peripheral station is received at the transceiver 205 via the antenna 206. The received speech signal is demodulated at the modem 210 through the switching circuit 204. The demodulated speech signal is extended by the compression/extension buffer 209 and decoded by the speech codec 208. The decoded speech signal is delivered to the external terminal via the control signal detecting circuit 207.

Figure 3:
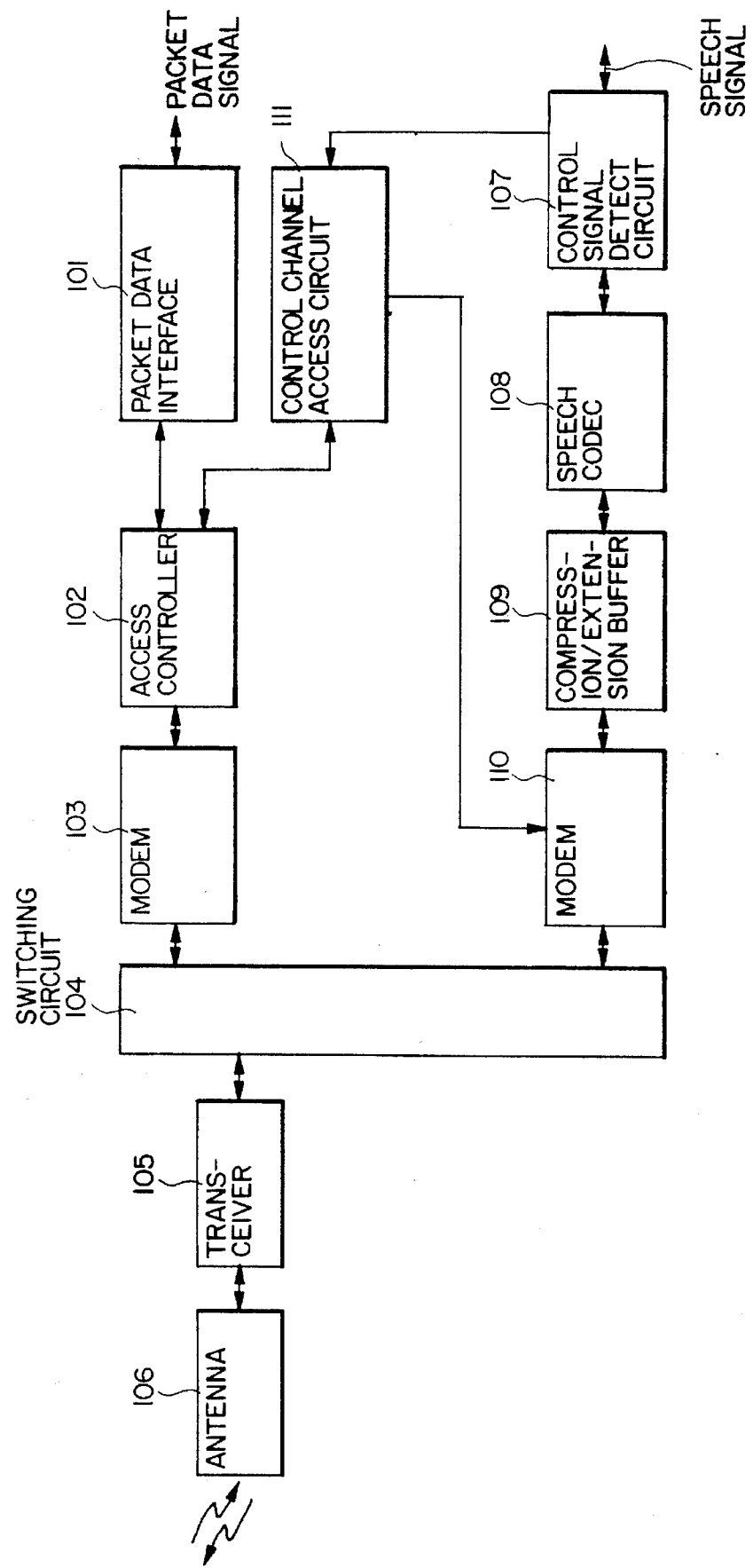
FIG. 3 is a block diagram of a preferred embodiment of a central station of the present invention.

FIG. 3 shows a block diagram of a preferred embodiment according to the teachings of the present invention of the central station 10 shown in FIG. 1. The central station 10 consists of a packet data interface 101, an access controller 102, modems 103 and 110, a switching circuit 104, a transceiver 105, an antenna 106, a control signal detecting circuit 107, a speech codec 108, a compression/extension buffer 109, and a speech communication demand assignment controller 111.

First, there will be described a packet data communication.

A packet data signal from the peripheral station 20 is received by the antenna 106. The received packet data signal is demodulated at the modem 103 through the transceiver 105 and the switching circuit 104. The demodulated packet data signal is delivered to an external terminal via the access controller 102 and the packet data interface 101. The access controller 102 executes access control, e.g., TDMA control or a random access control, for the radio channel of the packet data signal communication.

Packet data from the external terminal is input to the packet data interface 101. The modem 103 modulates the packet data signal and supplies the modulated packet data signal to the transceiver 105 via the switching circuit 104. The modulated packet data signal is transmitted from the antenna 106 to the peripheral station 20.

Next, a speech communication will be described. A speech signal from the external terminal is encoded by the speech codec 108 via the control signal detecting circuit 107. The encoded signal is compressed by the compression/extension buffer 109 and is modulated by the modem 110. The modulated signal is transmitted from the antenna 106 via the switching circuit 104 and the transceiver 105 to the peripheral station 20.

On the other hand, a speech signal from the peripheral station 20 is received by the transceiver 105 via the antenna 106. The received speech signal is demodulated by the modem 110 through the switching circuit 104. The demodulated speech signal is extended at the compression/extension buffer 109 and decoded by the speech codec 108. The decoded speech signal is delivered to the external terminal via the control signal detecting circuit 107.

Next will be described a request for a speech channel from the peripheral station to the central station and an assignment for a carrier frequency in response to the request signal.

Assuming that a call for the speech communication is originated at the peripheral station 20 and that the peripheral station communicates another peripheral station 2N. When the control signal detecting circuit 207 detects the origination of a call from the external terminal, the control signal detecting circuit 207 delivers a request signal for speech channel to the control channel access circuit 211. The request signal includes a unique discrimination code identifying a request for a speech communication channel.

The control channel access circuit 211 converts the request signal to a packet data signal and supplies the packet data signal including the request signal to the access controller 202. In this instant, the control channel access circuit 211 is equivalent in function to the packet data interface 201, as seen from the access controller 202. The access controller 202 handles the request signal from the control channel access circuit 211 in the same manner as the actual packet data from the packet data interface 201. The request signal is sent by the predetermined carrier assigned to packet data to the central station 10 as a request signal meant for the central station 10 via the modem 203, the switching circuit 204, the transceiver 205 and the antenna 206.

The central station 10 receives the request signal through the antenna 106, the transceiver 105, the switching circuit 104, the modem 103 and the access controller 102 by the speech communication demand assignment controller 111. The speech communication demand assignment controller 111 detects the unique discrimination code, assigns a carrier frequency available to the request signal and changes the carrier frequency of the modem 110 to the assigned carrier frequency.

The assignment signal for the assigned carrier frequency is sent to the peripheral station 20 and the other peripheral station 2N along the entirely opposite route, i.e., the access controller 102, the modem 103, the switching circuit 104, the transceiver 105 and the antenna 106 from the speech communication demand assignment controller 111.

The peripheral station 20 and the other peripheral station 2N receive the assignment signal at the control channel access circuit 211 through the antenna 206, the transceiver 205, the switching circuit 204, the modem 203 and the access controller 202. The control channel access circuit 211 detects the assignment signal for the assigned carrier frequency and changes the carrier frequency of the modem 210 to the assigned frequency.

The speech signal supplied from the external terminal to the control signal detecting circuit 207 in the peripheral station 20 modulates the assigned carrier at the modem 210 through the speech codec 208 and the compression/extension buffer 209. The modulated speech signal is sent to the other peripheral station 2N via the switching circuit 204, the transceiver 205 and the antenna 206. The peripheral stations 20 and 2N communicates by using the assigned carrier.

When the call ends, each control signal detecting circuit 207 in the peripheral stations 20 and 2N detects the end of call and feeds a corresponding signal to the control channel access circuit 211 to show that the call has ended. In response, the control channel access circuit 211 changes the carrier frequency of the modem 210 to a predetermined carrier frequency, converts the corresponding signal to the packet data signal and sends a call end report signal to the central station 10 routed through the access controller 202, the modem 203, the switching circuit 204, the transceiver 205 and the antenna 206 as the same manner as the request signal.

The speech communication demand assignment controller 111 in the central station 10 receives the call end report signal routed through the antenna 106, the transceiver 105, the switching circuit 104, the modem 103 and the access controller 102. On confirming the end of the call, the speech communication demand assignment controller reports to the peripheral stations 20 and 2N over the channel of the packet data signal that the assigned channel has been released, and ends the control procedure relating to speech communication.

As described hereinbefore, the present invention is readily implemented without complication for accessing a control channel by adding only the function for data format conversion from a request signal for a speech channel to a packet data signal. Furthermore, in the system aspect, the channel capacity of a part of an existing packet data communication channel is used only when needed. This eliminates the need for an exclusive channel for control and, therefore, saves limited frequency resources or the limited channel capacity. In addition, a speech communication is done between peripheral stations without a central station except for assigning the speech communication channel.

What is claimed is:

1. A communication system comprising a central station and a plurality of peripheral stations, being constructed such that said central station and said peripheral stations interchange packet data by using a predetermined first carrier frequency assigned for a packet data communication:

said central station including:
  receiving means for receiving a request signal from any one of said peripheral stations in the form of a packet data signal by using said first carrier frequency;
  assigning means for assigning a second carrier frequency for sending a speech signal in response to said request signal; and
  sending means for sending a report signal reporting assignment of said second carrier frequency to said peripheral stations in the form of a packet data signal by using said first carrier frequency;

each of said peripheral stations including:
  sending means for sending said request signal for requesting said speech channel to said central station by using said first carrier frequency;
  receiving means for receiving said report signal sent from said central station by using said first carrier frequency; and
  setting means for setting up said second carrier frequency for speech-communicating between said central station and said peripheral stations or between two or more of said peripheral stations in accordance with said report signal.

2. The system as claimed in claim 1, wherein said setting means comprises means for changing a modulating carrier frequency.

3. The system as claimed in claim 1, said peripheral station further comprising communication means for communicating with another peripheral station by using said assigned carrier frequency.

4. A central station which interchanges packet data with a plurality of peripheral stations by using a first carrier frequency preassigned for a packet data communication, comprising:

receiving means for receiving a request signal from any one of said peripheral stations in the form of a packet data signal by using said first carrier frequency;

assigning means for assigning a second carrier frequency for sending a speech signal in response to said request signal; and sending means for sending a report signal reporting assignment of said second carrier frequency to said peripheral stations in the form of a packet data signal by using said first carrier frequency.

5. A peripheral station which interchanges packet data with a central station by using a first carrier frequency preassigned for a packet data communication, comprising:

sending means for sending a request signal for requesting a speech channel to said central station by using said first carrier frequency;

receiving means for receiving a report signal sent from said central station by using said first carrier frequency; and setting means for setting up a second carrier frequency for speech-communicating between said central station and said peripheral station or between two or more of said peripheral stations in accordance with said report signal.

6. A method for controlling a peripheral station in a communication system having a central station and a plurality of peripheral stations, being constructed such that said central station and said peripheral stations interchange packet data by using a predetermined first carrier frequency assigned for a packet data communication, the method comprising the steps of:
- (a) generating a request signal for requesting an assignment of a speech channel corresponding to a call origination;
- (b) packetizing said request signal;
- (c) sending said packetized request signal to said central station by using said first carrier frequency;
- (d) receiving a packetized report signal for an available second carrier frequency sent from said central station by using said first carrier frequency;
- (e) setting up said second carrier frequency for a speech communication between said central station and said peripheral station or between said respective peripheral stations in accordance with said packetized report signal;
- (f) sending a speech signal to others of said peripheral stations by using said assigned second carrier frequency; and
- (g) receiving a speech signal from others of said peripheral stations by using said assigned second carrier frequency.

7. A method for controlling a central station in a communication system having a central station and a plurality of peripheral stations, being constructed such that said central station and said peripheral stations interchange packet data by using a predetermined first carrier frequency assigned for a packet data communication, the method comprising the steps of:
- (a) receiving a packetized request signal for an assignment of a speech channel from said peripheral station by using said first carrier frequency;
- (b) assigning a second carrier frequency for sending a speech signal in response to said request signal; and
- (c) sending a packetized report signal reporting assignment of said second carrier frequency by using said first carrier frequency.

8. A very small aperture terminal satellite communication system comprising a central station and a plurality of peripheral stations, being constructed such that said central station and said peripheral stations interchange packet data, said central station including:
- receiving means for receiving a packet data signal from any one of said peripheral stations by using a predetermined first carrier frequency for a packet data communication;
- detecting means for detecting a packetized request signal for requesting a speech channel;
- assigning means for assigning a second carrier frequency for sending a speech signal in response to said request signal; and
- sending means for sending a packetized report signal reporting assignment of said second carrier frequency to said peripheral station by using said first carrier frequency;

each of said peripheral stations including:
- converting means for converting said request signal into a packet data format;
- sending means for sending said converted request signal to said central station by using said first carrier frequency;
- receiving means for receiving said report signal from said central station by using said first carrier frequency; and
- setting means for setting up said second carrier frequency for speech-communicating between said central station and said peripheral station or between said respective peripheral stations in accordance with said report signal.

* * * * *